United States Patent [19]

McHugh, Jr.

[11] 4,405,458
[45] Sep. 20, 1983

[54] CONTINUOUS FLOW, VARIABLE CAPACITY SELF-COMPENSATING FLOATING WEIR

[76] Inventor: Leo A. McHugh, Jr., 2044 Brownsville Rd., Pittsburgh, Pa. 15210

[21] Appl. No.: 144,967

[22] Filed: Apr. 29, 1980

[51] Int. Cl.³ .............................................. E02B 15/04
[52] U.S. Cl. .............................. 210/242.3; 210/242.1; 210/923; 405/97
[58] Field of Search .................. 210/242.1, 923, 242.3; 405/96, 97, 104

[56] References Cited

U.S. PATENT DOCUMENTS

| | | |
|---|---|---|
| 3,303,932 | 2/1967 | Hirs et al. ......................... 210/242.1 |
| 3,428,178 | 2/1969 | Nash ................... 210/242.1 |
| 3,633,749 | 1/1972 | Panosh ................. 210/923 |
| 3,688,909 | 9/1972 | Titus ..................... 210/923 |
| 3,741,391 | 6/1973 | Donsbach .................. 210/923 |
| 3,782,553 | 1/1974 | Brehhe ................. 210/923 |
| 4,024,063 | 5/1977 | Mori ................... 210/242.1 |
| 4,212,740 | 7/1980 | Greene ................. 210/242.1 |

FOREIGN PATENT DOCUMENTS 2024030 1/1980 United Kingdom ................ 210/923

*Primary Examiner*—Peter A. Hruskoci

[57] ABSTRACT

The floating weir is a device for regulating or maintaining continuous flow from the surface level of a liquid body. As designed, the device provides a continuous, uninterrupted weir edge for controlling liquid flow. The device is particularly suited for skimming applications such as the removal or separation of surface debris, films, scum or secondary liquids of lesser density from a primary liquid body. The unit can be mounted as a fixed installation, such as a connection to a standpipe or, when mounted on a floating platform, as a mobile floating unit. The unit utilizes a float supported weir that is unattached to the apparatus, except for contact with an adjustable retainer, which sets the weir elevation and flow rate. The floating weir is mounted within a close fitting guide collar which guides weir movement and provides, in effect, a liquid seal between these members. The liquid seal also provides a lubricating film to insure free vertical weir movement. The unit is dynamic in that it responds immediately to flow interruptions caused by surface disturbances or variations in the flow rate of the piping system connected to the unit. The weir collar is supported by the float which is buoyed by the liquid level within the unit. Flow rate fluctuations, caused by surface flow interruptions, or an increase in the discharge rate from the unit, result in a lowering of the inside liquid level and a corresponding lowering of the weir edge. The lowering of the weir edge increases the flow rate to restore equilibrium and maintains continuous flow.

4 Claims, 9 Drawing Figures

CONTINUOUS FLOW, VARIABLE CAPACITY SELF-COMPENSATING FLOATING WEIR

BACKGROUND OF THE INVENTION

1. Field of the Invention

Surface weirs have long had widespread use as a means of controlling or measuring liquid flow rates. They are used in devices to skim liquid surfaces of unwanted materials and also in apparatus for separation of liquids having different densities. Chemical manufacturing processes, water treatment process, waste treatment processes and water pollution cleanup operations all use separating, flow regulating or skimming devices. It is to this broad area of application that the invention is directed.

2. Description of the Prior Art

Most of the weir devices in use as separating, regulating or skimming apparatus are somewhat limited in operation and application. The weir itself is generally of a segmental gate design with a limited control surfaces and it may or may not be buoyant or floatable. Where the weir itself is not buoyant, liquid operating levels, relative to the weir, must remain relatively constant if a continuous rate of flow is to be maintained. When the weir is buoyant or floatable, it must be responsive to liquid level changes on one side or the other of the weir itself. Most devices respond to the downstream liquid level. The weirs which are manually adjustable require frequent monitoring and the ones which are automatically controlled are complex and somewhat complicated. These weirs have a relatively narrow operating range or capacity and they are designed for either a fixed or a floating platform installation—but generally not both.

Weirs which are mounted on, or as part of, a floating platform are usually utilized as skimming devices in sewage treatment ponds, swimming pools or pollution cleanup operations. Flow across the weir is generally withdrawn from a sump on a suction basis either as a siphon or by mechanical means. A chronic problem for floating skimmer operations is loss of prime in the sump, caused either by flow interruptions across the weir itself as a result of disturbances to the unit or to the liquid surface, or as a result of changes in the suction flow rate.

The loss of prime in the sump causes a corresponding increase in the buoyancy of the entire skimmer apparatus. The increase in buoyancy and freeboard further restricts or stops the flow across the weir edge. A loss of siphon or ingestion of air into the suction system also results from the loss of prime. Once the prime is lost, the unit is inoperable until the prime is restored. Air trapped in the suction system, as a result of the prime interruption, must also be purged to restore flow. Automatically controlled devices to correct this problem are sophisticated and expensive. Corrective responses to disturbances and flow changes must be immediate.

SUMMARY OF THE INVENTION

The floating weir is a device which is quite simple in design and operation. In operation it has only one moving part, the weir itself, which is buoyant and unattached to the apparatus. It is confined only by a guide collar and an adjustable retaining device, which sets the elevation of the weir collar. Liquid flows over the weir edge and into a sump or basin. The buoyant weir is supported by the liquid level in the sump and it moves vertically with fluctuations in that liquid level. With the nested configuration of the weir and guide collars, response to liquid level changes or disturbances is immediate. The liquid film between the collars provides lubrication to eliminate any dampening of the compensating weir collar elevation change. The design of the unit provides a continuous, uninterrupted weir surface for control of flow. The floating weir apparatus has, for any size unit, a large flow operating range or capacity.

The weir operating elevation, which regulates the flow rate of weir effect, is easily and quickly adjusted for any desired capacity within the operating range. The unit can be adjusted vertically to provide an extremely fine weir effect or flow regulation. In operation, the unit will maintain continuous flow even when subjected to variations in suction flow or surface disturbances, and it will stabilize quickly. This stability of operation and the continuous flow characteristics makes the device well suited for use in floating skimmer applications. The simplicity of design makes it easy to manufacture and to maintain. The unit will also operate in very shallow waters.

DETAILED DESCRIPTION OF THE INVENTION

Figure 1:
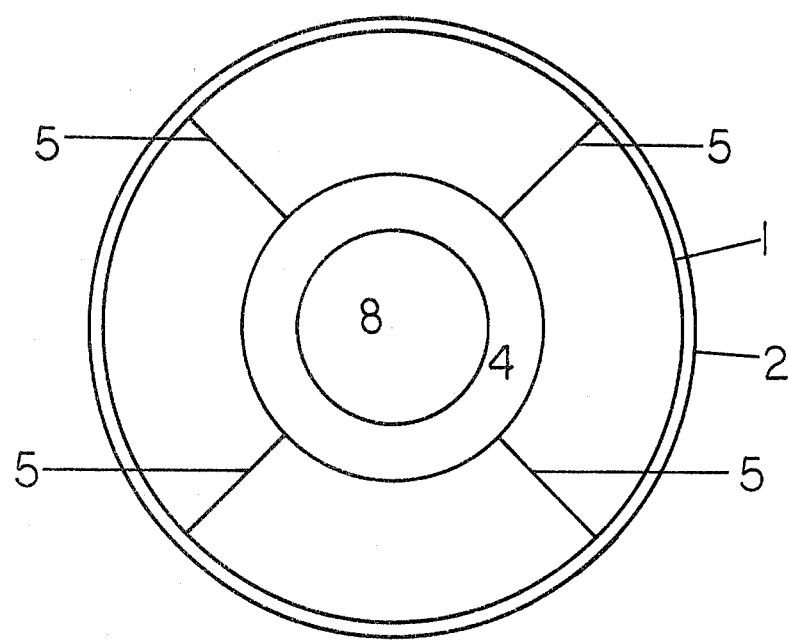
FIG. 1 is a plan view of the apparatus.
Figure 2:
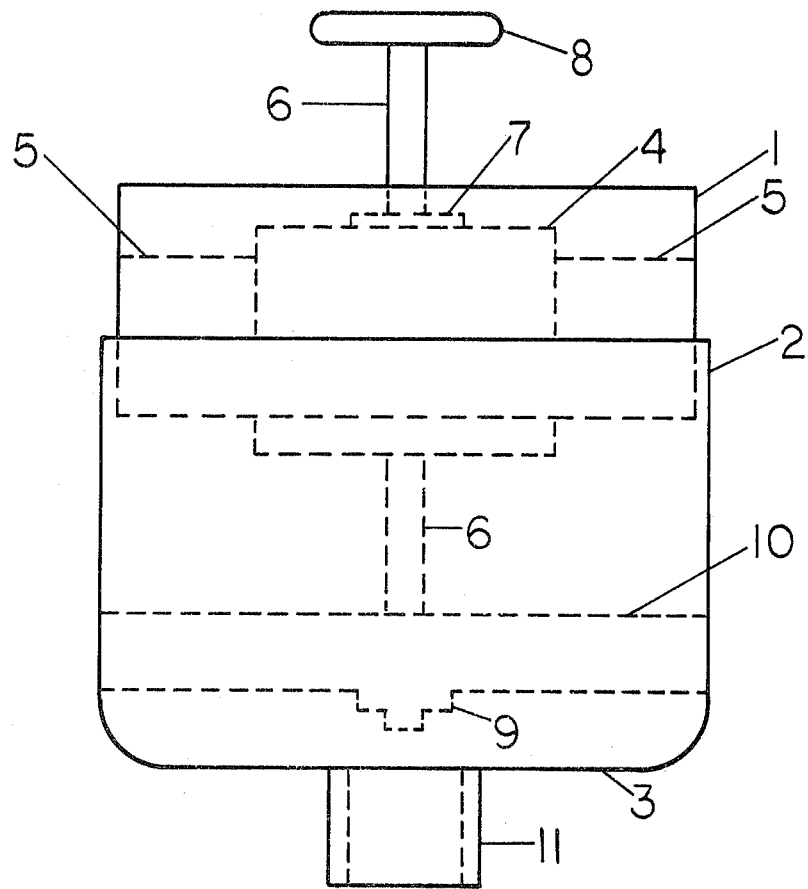
FIG. 2 is an elevation view of the apparatus.
Figure 3:
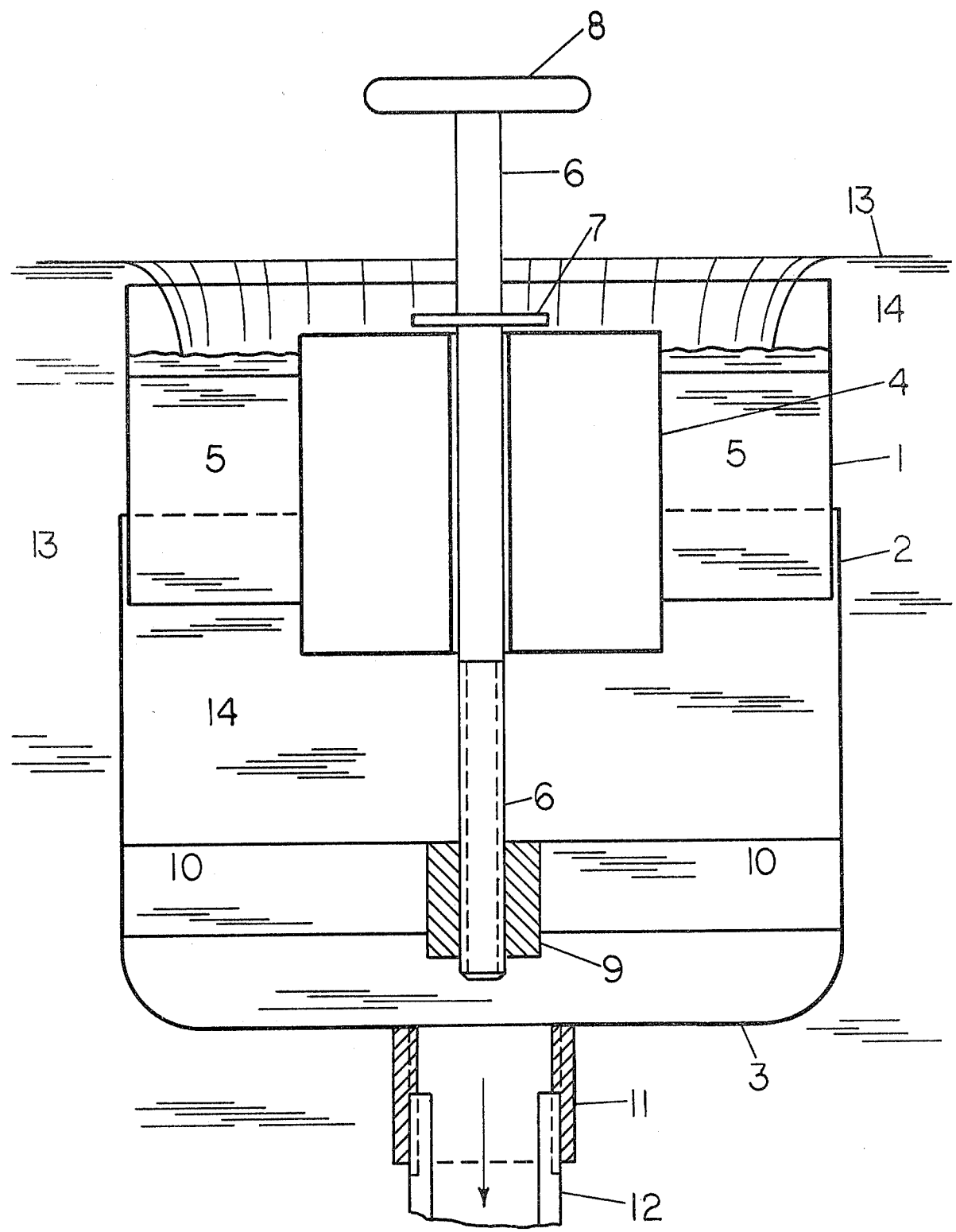
FIG. 3 is a cross-sectional elevation of the apparatus in an operating mode.

Referring to FIGS. 1, 2 and 3, a detailed description of the embodiment can be given. A weir collar 1 is fitted to nest within a guide collar 2, but unattached, so that it is free to move vertically. The clearance, however, is not excessive. It is adequate enough only for normal manufacturing tolerances which would permit free vertical movement of the weir collar 1 within the guide collar 2, and still provide an adequate liquid seal between these members. The weir collar functions as a weir and its top edge is a weir surface. The weir collar 1 is supported by a float chamber 4 and separating struts 5. The weir collar 1, the struts 5 and the float chamber 4 comprise the weir assembly. In operation, the weir assembly is the only moving part. It is designed so that there is a continuous uninterrupted weir edge at the top for control of liquid flow across its surface.

The weir assembly is retained with the guide collar 2 and is positioned vertically by an adjustable retaining guide rod 6. The rod 6 has a handwheel 8, a retaining flange 7 and a threaded end which is screwed into a guide rod support 9. The guide rod support 9 is mounted within the guide collar 2 by supporting struts 10. These components comprise the complete floating weir assembly. The complete assembly may be separately mounted on a sump 3 or integral with it as indicated here, to comprise an operating unit or apparatus. The sump discharge 11 is connected to a conduit 12 for liquid transfer.

The guide collar 2 and sump 3 are installed to that the elevation of the guide collar top edge edge is far enough below the primary liquid surface 13 to permit full vertical adjustment of the weir assembly. The weir assembly is designed so that it is positively buoyant. That is, when floating unrestrained on a liquid body, the weir edge is above the liquid surface. In operation, the weir assembly is restrained so that the weir edge elevation, relative to the main or primary liquid body 13, is below the liquid surface and surface liquid 13 flows over the weir collar 1 and accumulates within the body of the apparatus. This secondary liquid body 14 supports the weir assembly. The flange 7 of the adjustable retaining guide rod 6 exerts a downward restraining force on the weir assembly to limit the weir elevation as long as the secondary liquid level 14 within the apparatus supports the weir assembly at its maximum set position. The weir collar 1 is positioned vertically by the adjustable retaining guide rod 6 in accordance with the desired flow rate of the system or the desired skimming effect. Extremely fine adjustment for flow or maximum skimming effect is possible over a wide capacity range. Once the weir elevation or depth is set, the unit will maintain a continuous, constant flow rate unless there is a disturbance to the liquid surface 13, the apparatus, or a change in the suction flow rate. The adjustable retaining guide rod 6 also provides vertical radial, rotational and central alignment of the weir assembly during operation to prevent binding of the weir collar.

Liquid in the small annular space between the weir collar 1 and the guide collar 2 provides a lubricating film, which permits rapid, free vertical movement of the weir assembly, and also acts as a liquid seal to restrict bypass flow from liquid body 13 to 14. Any liquid transfer here, which might occur, is insignificant in comparison with the flow across the weir edge and it can be ignored in most applications.

Any disturbance, fluctuation or interruption of the unit which might reduce the normal flow across the weir edge, or any temporary increase in the suction rate, will cause the liquid level 14 inside the apparatus to drop. The drop in liquid level causes the weir assembly and the weir edge 1 to drop, thereby providing an immediate compensating increase in flow across the weir edge. The liquid level 14 is quickly restored until the float 4 is again seated against the flange 7 of the adjustable retaining guide rod 6 and the weir assembly again stabilizes at the set position. If for some reason the suction flow rate remains at a higher level, the weir assembly will stabilize at a lower position, without seating against the guide rod retaining flange 7. The increased flow across the weir edge will then match the new suction flow rate. If for some reason the disturbances or flow fluctuations are maintained, the weir assembly will assume a dynamic mode of operation which is instantaneously responsive to changes in the liquid level 14 and the flow of surface liquid 13. There will be no interruption in continuous flow.

Where the unit is mounted as a fixed installation such as on a standpipe in a tank or settlement pond, it may be subjected to fluctuations in elevation of the liquid level 13 relative to the apparatus. As long as the liquid level 13 does not drop below the edge of the guide collar 2, continuous flow will be maintained and the same sequence just described will respond to level changes. Where liquid level changes in excess of the adjustment range are anticipated, a floating platform installation should be used. The characteristic of continuous flow, dynamic response and stable operation for the apparatus makes it particularly suited for installation as a floating skimmer.

Figure 4:
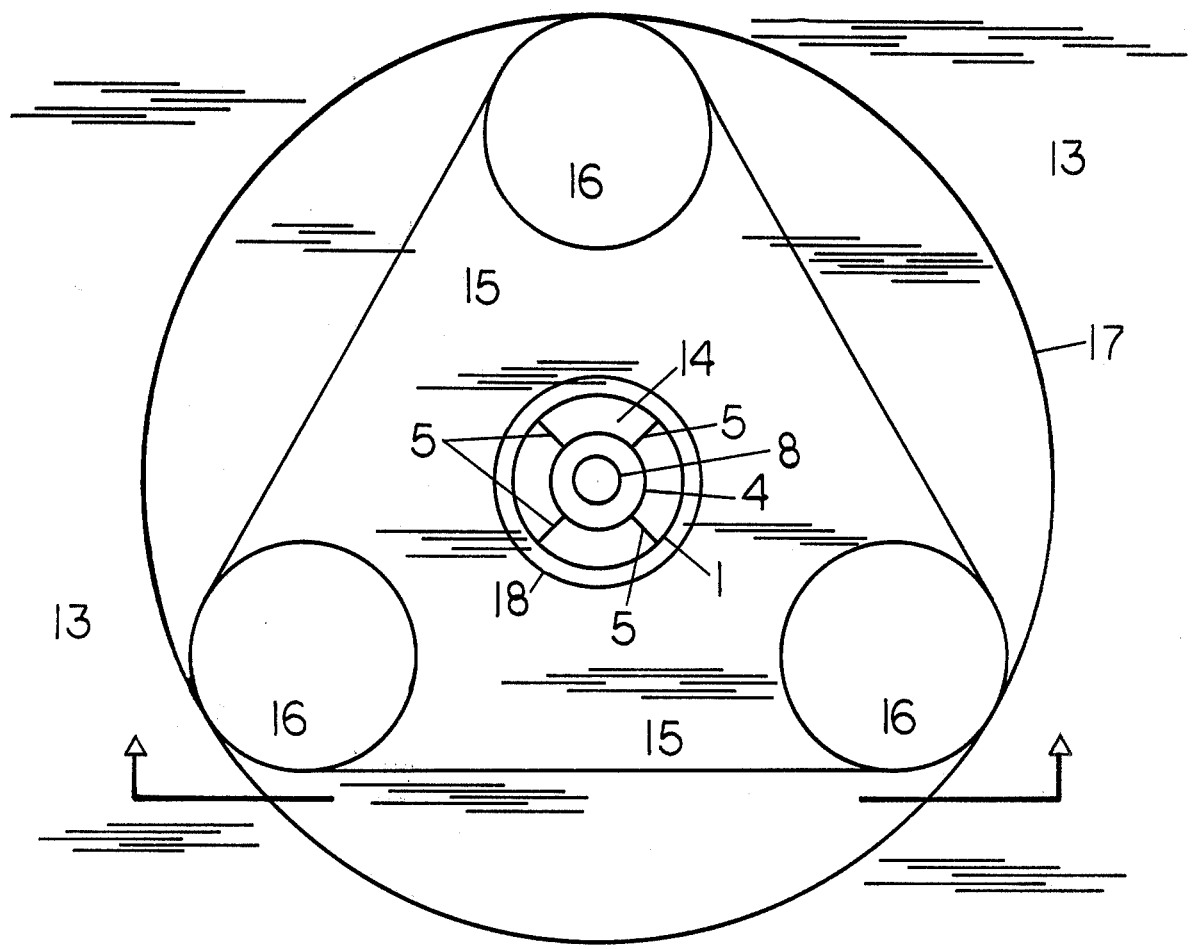
FIG. 4 is a plan view of the apparatus mounted and operating as a floating skimmer.
Figure 5:
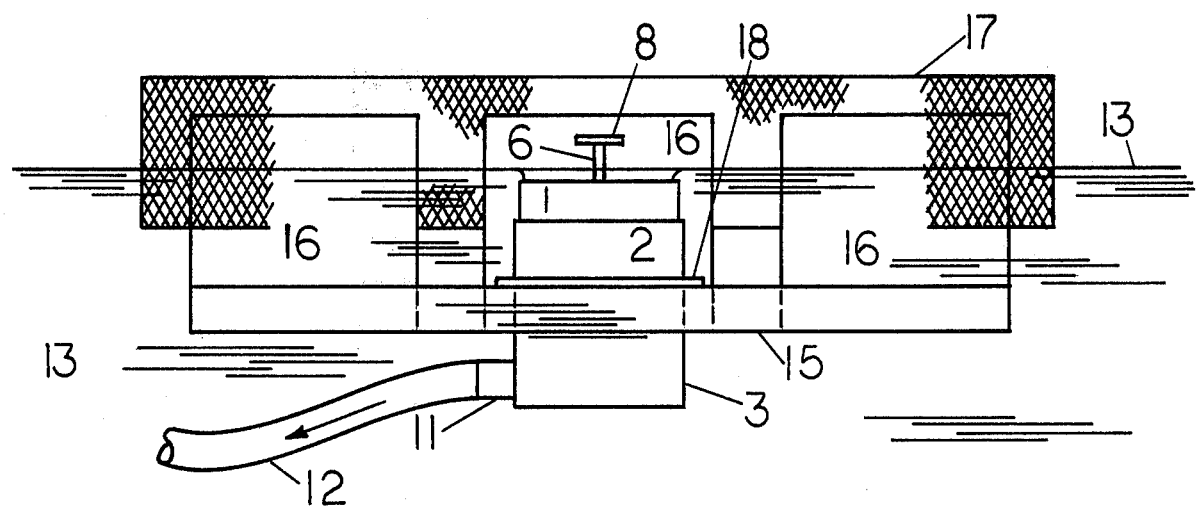
FIG. 5 is an elevation view of the apparatus taken along line 5—5 of FIG. 4.

FIGS. 4 and 5 illustrate an installation of the apparatus as a floating skimmer. The floating weir apparatus is mounted on a floating platform 15 which is supported by suitable floatation chambers 16. The sump 3 is mounted on the submerged platform 15 and the weir guide collar 2 is mounted on the sump by a suitable flange 18. A peripheral screen 17 is mounted on the platform assembly. The screen 17 serves as a dampening device for surface disturbances and eliminates floating debris from the weir intake which might foul the apparatus. The peripheral screen is not unique to only the floating installation of the apparatus; it serves equally as well when the apparatus is installed as a fixed installation with the screen suitably mounted. The sump discharge 11 and conduit 12 are connected to a suitable liquid transfer system. The design of the apparatus facilitates operation in very shallow waters.

Figure 6:
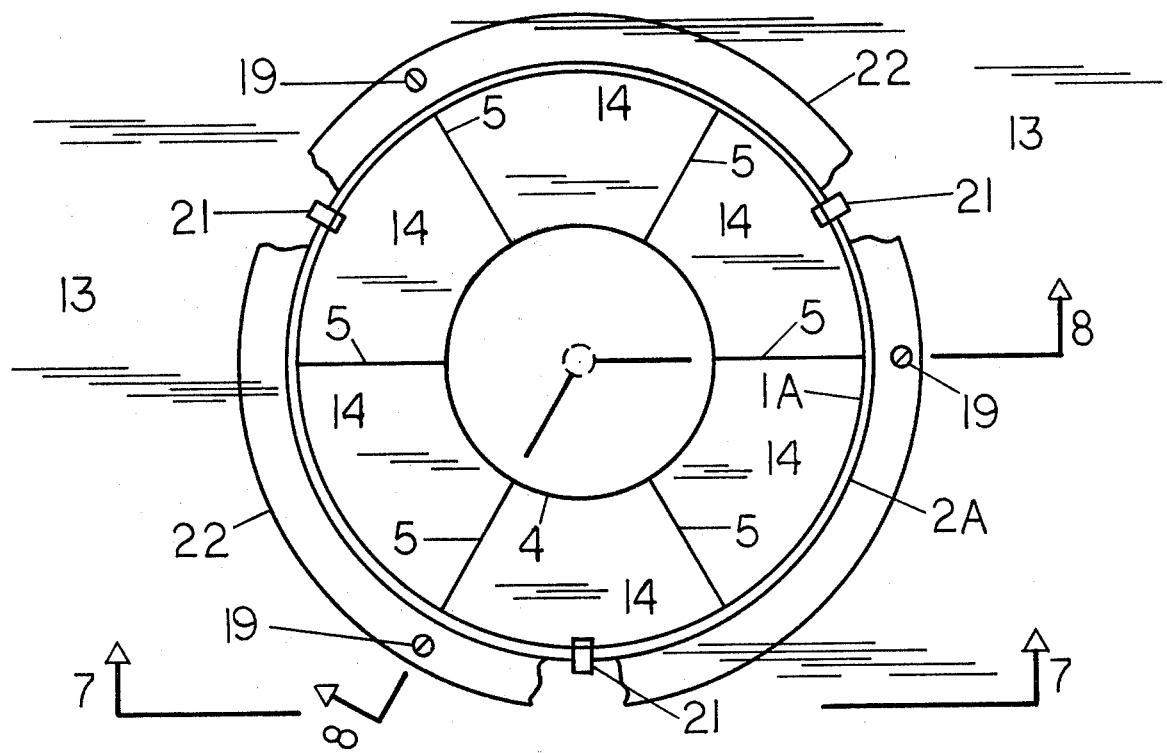
FIG. 6 is a plan view of a larger version of the apparatus, mounted and operating as a floating skimmer.
Figure 7:
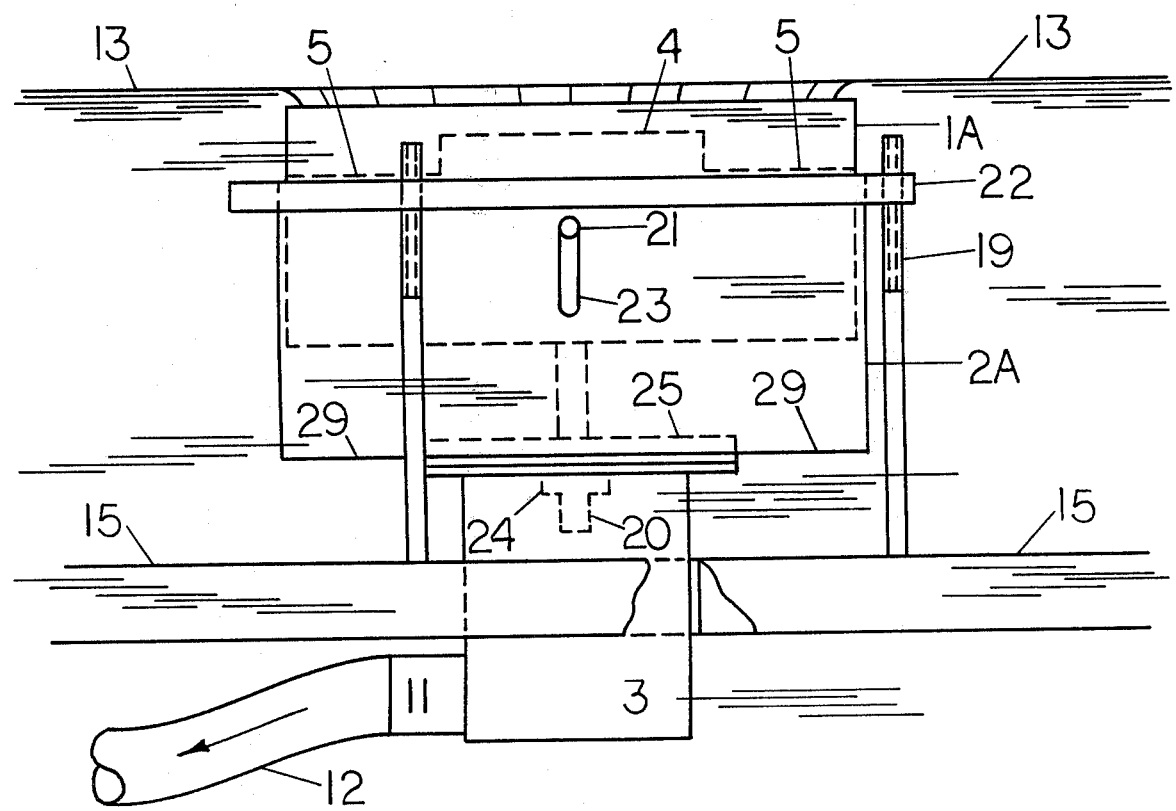
FIG. 7 is an elevation view taken along line 7—7 of FIG. 6.
Figure 8:
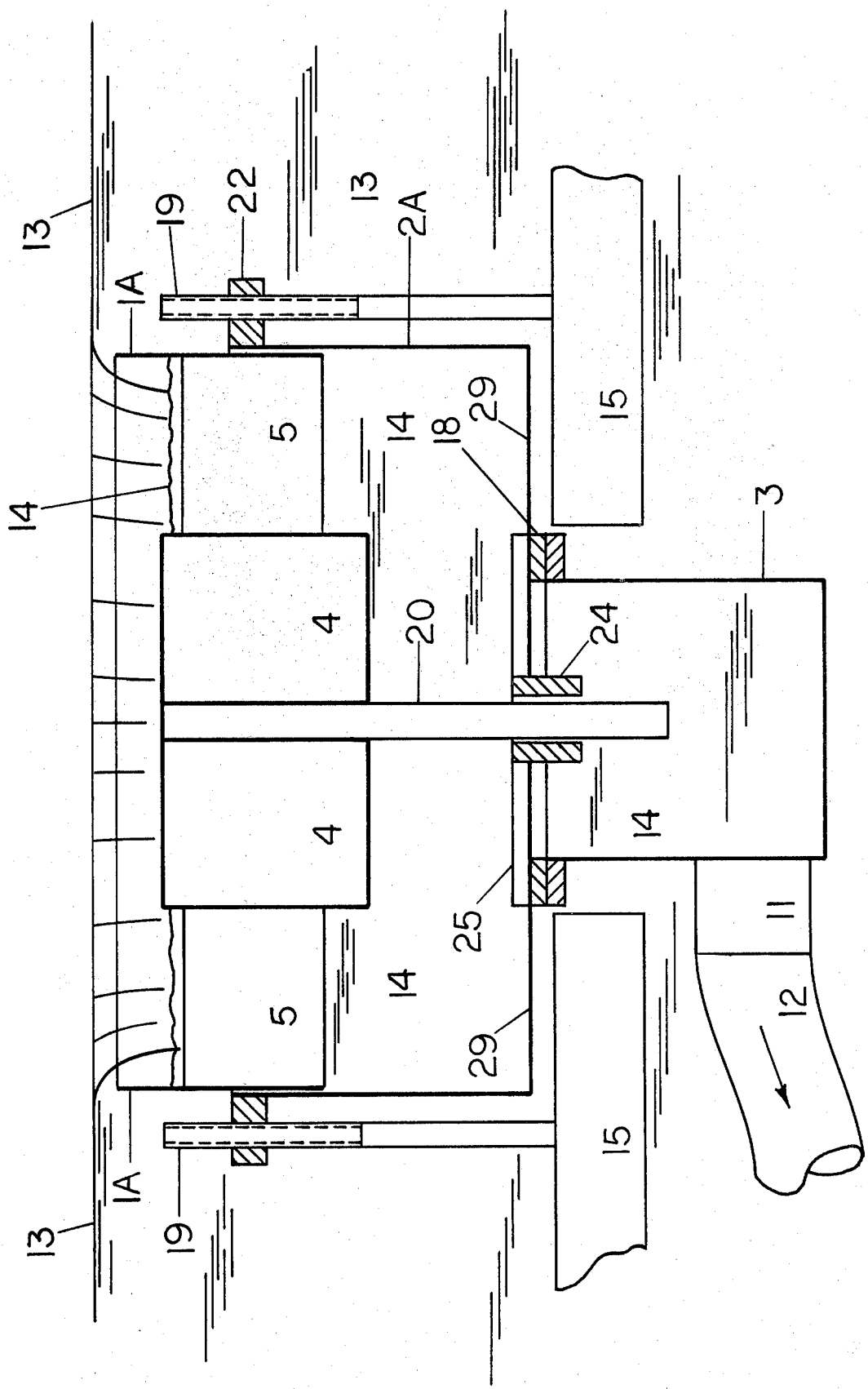
FIG. 8 is a sectional view taken along line 8—8 in FIG. 6.

A large, modified version of the apparatus, mounted on a floating platform 15, is detailed in FIGS. 6, 7 & 8. The guide collar 2A is modified to accommodate the larger dimensions of the unit, and to provide a means to retain the weir assembly within the guide collar. Vertical retaining guide slots 23 in the guide collar 2A, replace the adjustable center guide rod 6. Removable retaining guide pins 21 are mounted on the weir collar 1A and fitted through the guide slots 23 in the retaining guide collar 2A. The weir assembly, supported on the interior or secondary liquid level 14 by the float 4 and guided by the pins 21 in the slots 23, is free to move vertically within the constraints of the slots in the guide collar 2A. Vertical elevation of the apparatus and horizontal alignment relative to the primary liquid surface 13 are controlled by the adjusting rods 19 which, though free to operate, are anchored to the floating platform 15 by a suitable means.

The rods 19 are threaded through the guide collar support flange 22. A slot in the top end of the rods provides a suitable adjustment means. Due to the larger dimensions support flange 22 provides, for the retaining guide collar 2A, strength, support and concentric alignment relative to the weir collar 1A. As before, the weir assembly is positively buoyant. It floats on the internal liquid level 14 and the retaining guide pins 21 seat against the top of the guide slots 23 of the retaining guide collar 2A. The center guide rod 20, attached to the weir assembly, fits through the center guide 24 and is free to move vertically. The guide rod maintains vertical alignment of the assembly and acts to position it centrally. The center guide 24 is supported and positioned by struts 25. Operation and flow control adjustment are as previously described.

Figure 9:
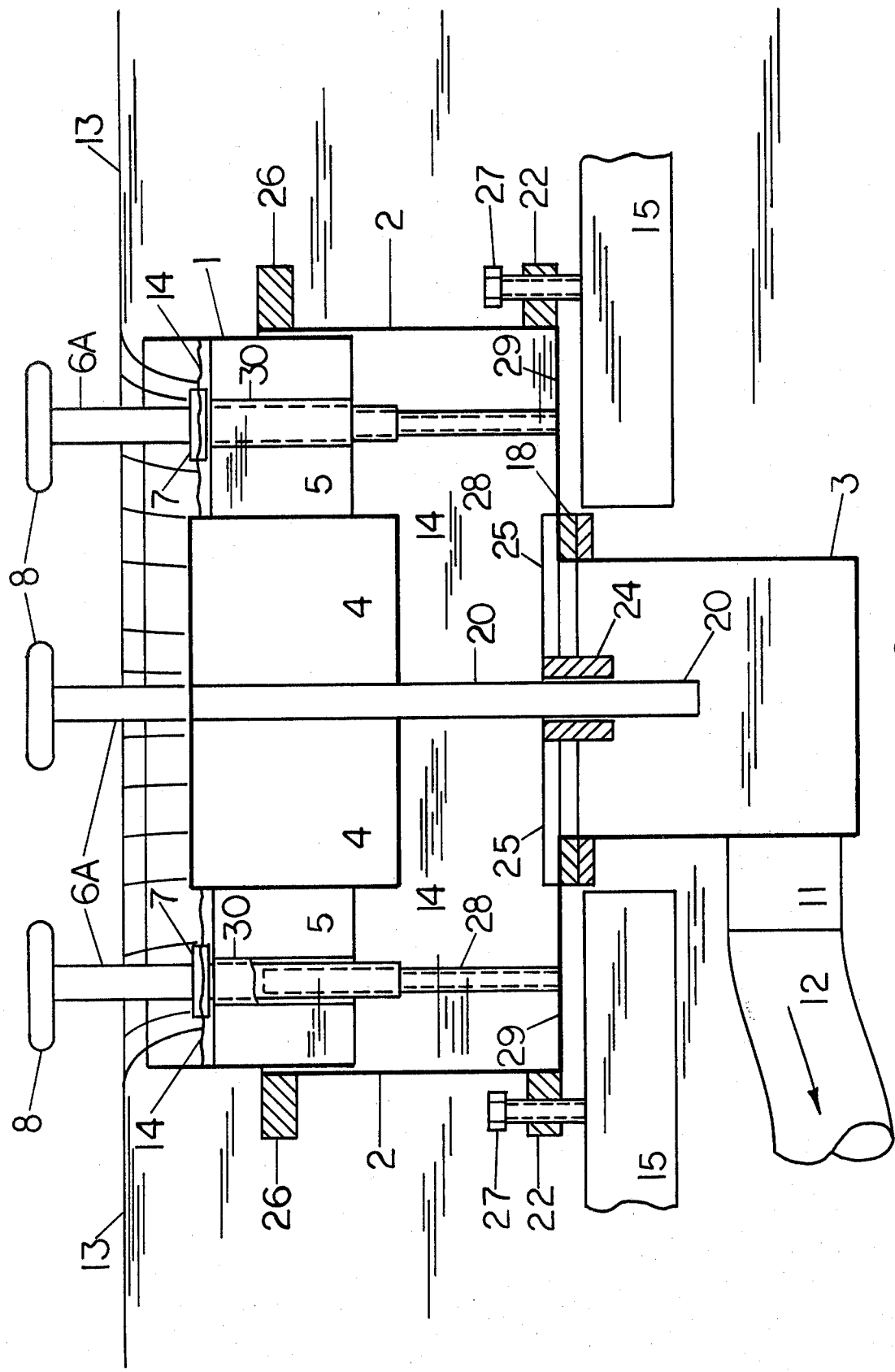
FIG. 9 is a sectional view, similar to FIG. 8, showing a variation in the adjustment means.

FIG. 9 is a sectional view taken in the same plane as FIG. 8 and shows a different adjustment concept. The guide collar support flange 22 has been relocated to the base of the guide collar and replaced by another flange 26. In place of the adjusting rods, leveling jacks 27 are mounted in the flange 22. These jacks support the apparatus on the platform 15 and are used only for horizontal leveling of the apparatus. The guide rod supports 28 are anchored to the base 29 of the assembly and threaded to engage the modified adjustable retaining guide rod 6A. The guide rod is similar to the one shown in FIGS. 1, 2, 3, 4 & 5 except that it is threaded laterally to receive the support rod 28. The guide rods 6A are inserted in guides 30 which are attached to the weir collar support struts 5. The top of the guides 30, during normal operation, seat against the guide rod retaining flanges 7. The adjustment rods 6A in this arrangement are all located within the weir assembly perimeter. The adjustable guide rods 6A and the guide rod 20 provide vertical alignment of the weir assembly and position it centrally. Operation and flow control adjustment are as previously described.

While the geometry of the unit illustrated is circular, no restriction of the invention to this particular shape is to be construed. The unit could be oval, square, rectangular, triangular, etc., and still function as well. The same condition would apply to the float configuration, location, size, shape, etc.

I claim:

1. A continuous flow, variable capacity self-compensating, floating weir apparatus for use in both fixed and mobile, free floating applications for separating liquids of different densities, for removing surface borne debris, films, scums and similar types of contaminants from liquid bodies in tanks, settlement ponds, manufacturing and waste treatment processes, rivers, lakes and other large bodies of water, and for regulating the transfer flow of liquid from one body to another comprising:
   a. a float supported, vertically moveable weir collar which forms a positively bouyant weir having a weir surface for control of liquid flow,
   b. a guide collar fitted to nest with, but unattached to, said moveable weir collar to control orientation and guide movement of said moveable weir collar, said guide collar in conjunction with said weir collar forming a continuous combined liquid seal and lubricating film for restriction of bypass liquid flow and for free, unrestrained movement of said weir collar;
   c. guide means for maintaining vertical, radial, rotational and central alignment of said weir collar within said guide collar,
   d. means for vertically adjusting and controlling the elevation of said weir collar,
   e. means for limiting the elevation of said weir collar and for retaining said weir collar within said guide collar,
   f. flange means being arranged to provide strength, support, and alignment of said guide collar,
   g. and a sump with a discharge connection for collecting and discharging liquid flowing over said weir surface, said weir collar being supported by and responsive to the liquid in said sump.

2. An apparatus according to claim 1 wherein said weir has a continuous and uninterrupted weir surface.

3. An apparatus in accordance with claim 1 including a floating platform for supporting said floating weir apparatus in a mobile, free floating application, said floating platform comprising:
   a. flotation means for buoyant support of said weir apparatus and platform on a body of liquid,
   b. means for mounting said weir apparatus on said floating platform,
   c. and an adjustment means for controlling the horizontal plane and the elevation of said weir apparatus relative to the platform and the liquid surface.

4. An apparatus in accordance with claim 1 including a peripheral screen surrounding said weir collar to prevent fouling of the apparatus and to dampen surface disturbances.

* * * * *